United States Patent [19]
Gravesen et al.

[11] Patent Number: 5,452,878
[45] Date of Patent: Sep. 26, 1995

[54] MINIATURE ACTUATING DEVICE

[75] Inventors: Peter Gravesen, Nordborg; Jens a. Branebjerg, Nærum, both of Denmark

[73] Assignee: Danfoss A/S, Nordborg, Denmark

[21] Appl. No.: 167,800

[22] PCT Filed: Jun. 17, 1992

[86] PCT No.: PCT/DK92/00188

§ 371 Date: Dec. 14, 1993

§ 102(e) Date: Dec. 14, 1993

[87] PCT Pub. No.: WO92/22763

PCT Pub. Date: Dec. 23, 1992

[30] Foreign Application Priority Data

Jun. 18, 1991 [DE] Germany ............................ 41 19 955.3

[51] Int. Cl.$^6$ .................................................. F16K 31/02
[52] U.S. Cl. ................................ 251/129.02; 251/129.01; 251/331
[58] Field of Search .......................... 251/129.01, 129.02, 251/129.05, 331

[56] References Cited

U.S. PATENT DOCUMENTS

| | | | |
|---|---|---|---|
| 4,756,508 | 7/1988 | Giachino | 251/331 |
| 4,821,999 | 4/1989 | Ohtaka | 251/129.02 |
| 5,065,978 | 11/1991 | Albarda et al. | 251/331 X |
| 5,069,419 | 12/1991 | Jerman | 251/129.01 X |
| 5,082,242 | 1/1992 | Bonne et al. | 251/331 X |
| 5,322,258 | 1/1994 | Bosch et al. | 251/129.05 X |

*Primary Examiner*—John Rivell
*Attorney, Agent, or Firm*—Lee, Mann, Smith, McWilliams, Sweeney & Ohlson

[57] ABSTRACT

A miniature actuating device with a carrier, a diaphragm, a hollow space formed between the carrier and the diaphragm and an insulating layer arranged between them and with two electrode terminals for producing an electrostatic field between the diaphragm and the carrier for an activated state. With an actuating device of this kind, it is desired that the throw can be achieved under the influence of the electrostatic field be rendered as large as possible. To that end, the hollow space is present only in the state of rest and in the activated state virtually disappears maintaining the diaphragm buckle free.

24 Claims, 3 Drawing Sheets

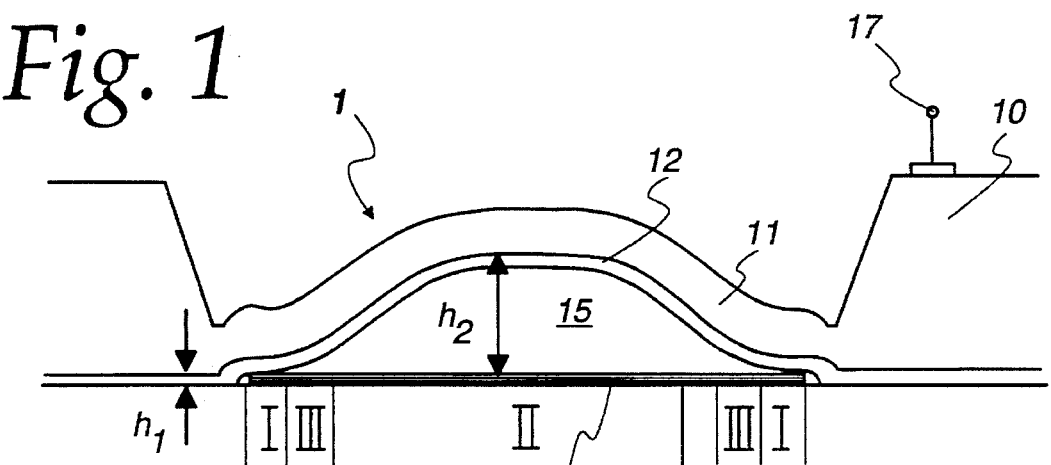
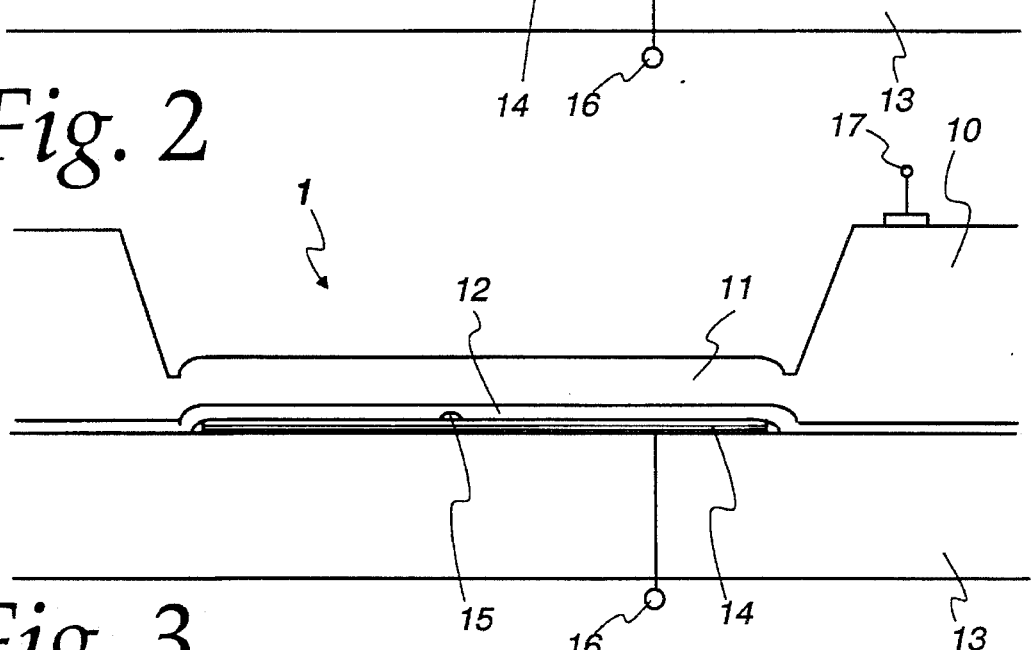
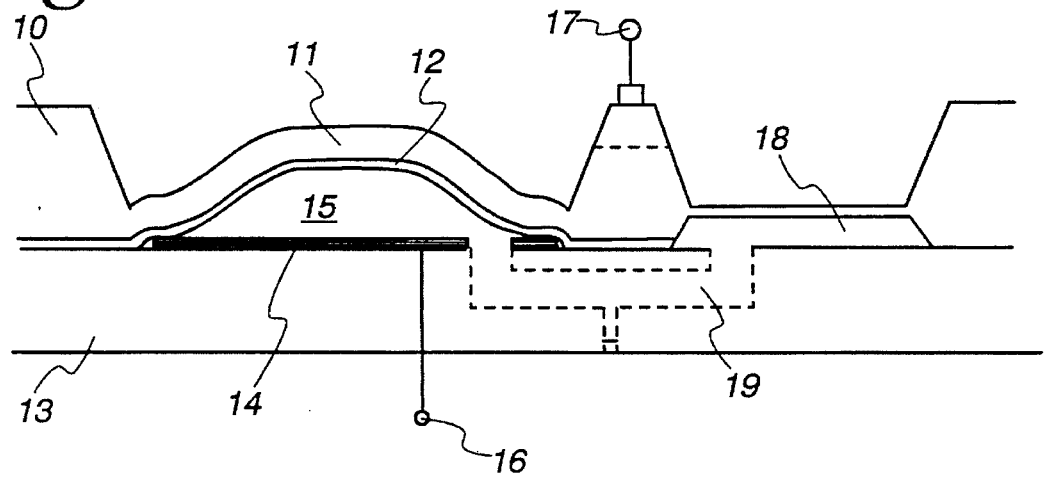

MINIATURE ACTUATING DEVICE

The invention relates to a miniature actuating device with a carrier, a diaphragm, a hollow space being formed between the carrier and the diaphragm and an insulating layer being arranged between them, and with two electrode terminals for producing an electrostatic field between the diaphragm and the carrier for an activated state of the diaphragm.

A miniature actuating device of this kind is known from GB 2 155 152 A. The actuating device serves in that case to open and close a valve, preferably for pneumatic purposes. The valve consists of three layers of silicon in which the hollow space and also a valve inlet and valve outlet are etched. The valve inlet and valve outlet open into the hollow space. In the state of rest, the valve is open. When a d.c. voltage is applied to the two electrode terminals, an electrostatic field is produced which deflects the diaphragm towards the carrier in an activated state and closes the valve.

U.S. Pat. No. 4,585,209 also describes a microvalve, in which the diaphragm opens or closes a through-opening. For that purpose, the diaphragm is in the form of a spring which is attached at one end to the carrier. When the electrostatic field is produced, the diaphragm positions itself also with its other end against the carrier, and thus closes the through-opening.

MEMS 90 (Honeywell Inc.), pages 95 to 98 "Micromachined Silicon Microvalve" describes a microvalve with a diaphragm suspended resiliently at one end, which opens the through-opening of the valve in the state of rest and closes it when an electrical field is applied.

DE 38 14 150 A1 discloses a valve arrangement of microstructured components which can be activated in different ways. A carrier is provided, with a hollow space which is covered by the diaphragm and into which a valve duct opens. The diaphragm is moved by a first force towards the carrier and is firmly held there by a second force, which is applied by an electrostatic field. The first force is produced, for example, by heating the diaphragm, the internal pressure stresses of the diaphragm etched in silicon being exploited.

DE 39 19 876 A1 describes a further microvalve in which the diaphragm and the carrier enclose a hollow space and the closure member is arranged on the side of the diaphragm remote from the carrier.

The disadvantage of all the known valves and the actuating devices located therein is that the throw, that is, the path that the actuating device is able to cover, is limited if an electrostatic field is intended to be the sole means of operation. On the other hand, the use of two different drive means for moving and holding the diaphragm requires greater complexity in the control.

The invention is based on the problem of providing an electrostatically operable actuating device having a relatively large throw.

This problem is solved in a miniature actuating device of the kind mentioned in the introduction in that the hollow space is bounded by two surfaces which in a contact region, in which the surfaces touch each other, are parallel to one another, and at least in an application region adjoining the contact region, in which the two surfaces can be brought to bear on each other, are buckle-free.

By this means, in the activated state the diaphragm and the carrier lie virtually flat one on top of the other. The diaphragm then lies in the activated position in the contact region parallel to the carrier. The throw then corresponds to the maximum height of the hollow space bounded solely by the two surfaces. The content of the hollow space, which is compressed on movement of the diaphragm into the activated position, together with the internal spring forces of the diaphragm, assumes the restoring function in order to move the diaphragm into the inoperative position or the state of rest again when the electrostatic field is turned off. Close to the contact region there is always a relatively strong electrical field and thus also relatively large forces.

Advantageously, the insulating layer extends over the entire area of the diaphragm. The insulating layer firstly serves to ensure that no short-circuiting can occur between the diaphragm and the carrier, which would cause the electrostatic field to collapse and, secondly, defines the dielectric which is a determining factor of the characteristic of the field strength of the electrostatic field between the diaphragm and the carrier.

In a preferred form of embodiment, provision is made for the hollow space to be filled with a fluid having a predetermined dielectric constant, predetermined low conductivity and low contamination with particles of solid material. Because of the low electrical conductivity, any electrical losses are insignificant, and because of the purity satisfactory mechanical behaviour is achieved.

Preferably, in the state of rest a first region is provided in which the diaphragm is spaced from the carrier, the spacing corresponding to the thickness of the insulating layer, and a second region is provided in which the diaphragm is spaced further away from the carrier; in the activated state the size of the spacings in the second region decreases to the size of the spacing in the first region. When an electrostatic field is produced between the diaphragm and the carrier in the state of rest, the field strength is greatest in the first region. Here, the distance between the diaphragm and the carrier is at its smallest. Where the first region transfers into the second region, the diaphragm starts to move towards the carrier until it lies on the carrier in this transitional region. The first region thus enlarges and the second region decreases. The transitional region migrates increasingly into the second region until finally the entire diaphragm lies virtually flat on the carrier wherever an electrical field is present. Relatively small hollow spaces, for example produced by a folded formation of the diaphragm, remain behind. This improved action is to be explained by the following analysis:
Using the variables:

$h2$: throw=greatest distance in the second region, $h1$: thickness of the insulating layer=distance in the first region, $\epsilon_{r,IS}$: relative dielectric constant of the insulating layer, $\epsilon_{r,me}$: relative dielectric constant of the fluid in the hollow space, $E_{max}$: the maximum electrical field across the insulating layer, $P_{max}$: the maximum pressure on the diaphragm, then for a simple parallel plate actuating device:

$$P_{max} = \frac{1}{2} \left( \frac{\epsilon_{r,me}}{\epsilon_{r,IS}} \right)^2 \epsilon_o E_{max}^2 \times \left( \frac{h1}{h2} \right)^2$$

For the embodiment according to the invention, however, the following applies:

$$P_{max} \approx \left( \frac{\epsilon_{r,me}}{\epsilon_{r,IS}} \right) \epsilon_o E_{max}^2 \left( \frac{h1}{h2} \right)$$

Because the relationship between the thickness of the insulating layer and the throw of the actuator is normally within the range from $1/10$ to $1/1000$, considerably larger forces are achieved with the actuating device.

It is here preferable for the first region to encompass the edge of the diaphragm completely. The forces causing the movement of the diaphragm therefore migrate from the outside inwards. The diaphragm is not moved jerkily as a whole but is able, following the forces, to position itself gradually on the carrier.

If, on the other hand, the first region is arranged in the middle of the diaphragm, the forces migrate from the inside outwards. In each case, the movement of the diaphragm always runs from a region having a small spacing to a region having a larger spacing. The forces or the maximum of the force follows the movement.

The largest spacing in the second region is advantageously a multiple of the spacing in the first region. This is possible because the electrostatic field need only be sufficiently strong for the forces produced thereby to be able to move the diaphragm in the first region or in the transitional region between the first and second region. The largest spacing of the diaphragm from the carrier therefore decreases successively until the field strength, which is essentially produced from the quotient of voltage and spacing between carrier and diaphragm, has become so great that the forces that it produces are sufficient to move the diaphragm towards the carrier.

Preferably, the carrier has an electrically conductive surface layer which is arranged in the hollow space. The carrier need not therefore be of fully electrically conductive construction. On the other hand, the arrangement of the surface layer in the hollow space ensures that the spacing between the diaphragm and the carrier in the first region is in fact determined only by the thickness of the insulating layer.

It is also preferable for the surface of the carrier in the hollow space to be of substantially flat construction. This means that manufacture can be relatively simple.

In another preferred embodiment, provision is made for the diaphragm to be flat in the state of rest and for the carrier to have a concave curvature. This has the advantage that no pressure is required in the hollow space to bring the diaphragm into the inoperative position.

Advantageously, the hollow space is connected to a pressure-storage space. The fluid displaced from the hollow space on movement of the diaphragm into the activated position is able to escape into the pressure-storage space. This enables the hollow space in fact to disappear completely. It is even possible to use a non-compressible fluid to fill the hollow space, if the hollow space has a wall of resilient construction.

Preferably, however, the pressure-storage space has a constant volume and the hollow space and pressure-storage space are filled with a compressible fluid. The compressible fluid can be a gas charge, for example, in particular an air charge. The pressure-storage space can be smaller than or the same size as the hollow space. The compressible fluid then acts as a spring which restores the diaphragm to the inoperative position again.

In a preferred embodiment, at least one further diaphragm is provided, the hollow space of which forms the pressure space for the first diaphragm. This is particularly advantageous when the two diaphragms are to be operated alternately.

It is then preferable for the pressure of the fluid and the rigidity of the diaphragms to be defined in relation to one another so that, with the field turned off, one diaphragm moves into the state of rest when another diaphragm moves into the activated state. A forced change-over is thereby achieved, that is to say, when the one diaphragm moves into the activated position, the other diaphragm moves into the state of rest. More than two diaphragms may be provided, all hollow spaces then being interconnected. In that case, only one diaphragm or a predetermined number of diaphragms simultaneously is/are in the activated position.

Preferably, the diaphragms are arranged next to one another. In this way the extremely low losses and the minimum of delay as the fluid changes from one hollow space to another are achieved.

In a preferred embodiment, the diaphragms are arranged on the same side of the carrier. All positioning devices that are to be actuated by the actuating device can then be arranged on the same side of the carrier.

In another preferred embodiment, the diaphragms are arranged on opposite sides of the carrier. This is an advantage, for example, if the positioning devices involved are arranged to be operated mechanically in alternation.

In a further preferred construction, the surface layer is subdivided into at least two regions separated electrically by an insulating region, the regions being arranged to be separately supplied with voltage. In this manner the electrical field and thus the force on the diaphragms can be restricted to different regions. Force acts on the diaphragm only where there is also an electrical field present. If, for example, there are two regions, the diaphragm can be caused to engage either one or the other side of the carrier. By this means it is possible for the surface of the diaphragm opposing the carrier to be tilted into different positions. If the diaphragm is, for example, circular, the two regions can be of semi-circular form. Such an actuating device is thus in the form of a rocker-action actuating device. An actuating device of this kind has the advantage that, when it is suitably arranged, the middle of the diaphragm is able to tilt with its surface in the desired direction, whilst the middle of the diaphragm on the other side is only slightly displaced. The volume of the hollow space is in practice hardly changed.

The restoring force can be achieved, for example, in that the hollow space is filled with a non-compressible fluid. In another preferred embodiment, provision is made for a support for the diaphragm to be arranged between the regions. A support of this nature can be in the form, for example, of a small post. This has the advantage that the hollow space need not be filled with a fluid but can even be substantially evacuated, whereby the operating speed is substantially increased. Moreover, production in this case is simpler, because the hollow space does not have to be put under pressure.

With a rocker-action actuating device of this kind, it is also an advantage for the diaphragm to have a rigid lever in the area of the insulating region on its side remote from the carrier. This promotes the tilting movement. The ends of the lever cover longer distances than the middle of the lever. If the lever is provided with a mirror, it is possible to effect a deliberate change-over of light paths using such a rocker-action actuating device.

In a further preferred embodiment, the diaphragm has corrugated regions. Corrugated regions allow for a greater movement of the diaphragm in the manner of a concertina. Larger throws are achieved thereby.

The corrugated regions can be arranged in the form of concentric rings or can be arranged spirally. In cross-section, the diaphragm then appears to undulate in parts, and the base points of the waves can be caused to engage the carrier. If the corrugated regions are arranged spirally, then this has the advantage that the movement of the diaphragm towards the carrier, which starts in the edge region of the diaphragm, follows the spiral of the corrugation. The fluid can be squeezed out of the hollow space through the spiral that has been formed. Even with small diameters, it is possible to achieve a considerable throw in this case.

The invention also relates to a microvalve with a miniature actuating device, a closure member being arranged on the side of the diaphragm remote from the carrier. The closure member does not influence the opening and closing characteristics, that is to say, the movement of the diaphragm, which continues to be determined exclusively by the electrostatic field and the pressure built up in the hollow space.

The invention is described with reference to preferred embodiments in conjunction with the drawings, in which:

FIG. 1 shows an actuating device in the state of rest,

FIG. 2 shows an actuating device in the activated state,

FIG. 3 shows a further embodiment of an actuating device,

Figure 4:
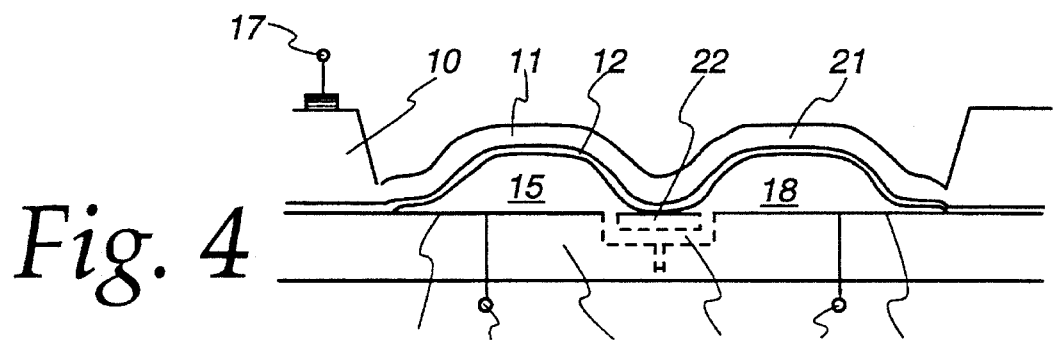
FIG. 4 shows an actuating device with two diaphragms.

An actuating device 1 has a carrier 13 which is connected to a substrate 10 by way of an insulating layer 12. The substrate 10 is electrically conductive. A diaphragm 11 is etched in the substrate 10. Diaphragm 11 and carrier 13 together enclose a hollow space 15. In the hollow space 15 the carrier 13 has an electrically conductive surface layer 14. The surface layer 14 is connected to an electrode terminal 16 and the diaphragm 11 is connected to an electrode terminal 17. The two electrode terminals 16, 17 are arranged to be connected to a electric direct voltage source. When an electric direct voltage source is applied between the two electrode terminals 16, 17, an electrostatic field is produced between the diaphragm 11 and the carrier 13 or, more accurately, between the diaphragm 11 and the surface layer 14.

The diaphragm 11 is illustrated in FIG. 1 in the state of rest or the inoperative position. In the state of rest a first region I is provided, in which the diaphragm 11 is spaced from the carrier 13 and from the surface layer 14 by a distance that is essentially determined by the thickness of the insulating layer 12. In the embodiment illustrated, the surface layer 14 is positioned on the surface of the carrier 13 and projects above it. The surface layer 14 may equally well be incorporated into the surface of the carrier 13 and lie flush with it. For the rest, the surface layer 14 has been shown exaggeratedly thick for reasons of clarity. In reality there is virtually no difference between the surface of the carrier 13 and that of the surface layer 14 in respect of their geometric dimensions. The surface layer 14 will therefore largely be disregarded in the further consideration from geometrical aspects.

The insulating layer 12 has a thickness, for example, h1, so that the spacing between the diaphragm 11 and the carrier 13 in the first region I is also h1, if the thickness of the surface layer 14 is taken to be negligibly small. Next to the first region I there is a second region II, in which the spacing of the diaphragm 11 from the carrier 13 increases towards the middle. The greatest spacing h2 in the hollow space 15 is a multiple of the spacing h1. Between the first region I and the second region II there is a transitional region III.

When an electric direct voltage is now applied to the electrode terminals 16, 17, an electrical field is produced between the diaphragm 11 and the carrier 13. The strength of the electrical field is determined by the voltage divided by the distance between the diaphragm and the carrier 13. It follows that the field strength in the first region I is greater than the field strength in the second region II. In the transitional region III between the first region I and the second region II, the field strength is less than in the first region I but greater than in the second region II. Its magnitude is such that the force it produces is sufficient to move the diaphragm 11 towards the carrier 13. The transitional region III is thereby displaced further and further into the second region II. The first region I spreads out more and more. As a consequence thereof, the diaphragm 11, proceeding from its periphery, is caused to engage the carrier 13 and finally lies completely flat against the carrier 13. The hollow space 15 has virtually completely disappeared. Of course, vestiges of the hollow space 15 may remain, for example by virtue of slight folds forming in the diaphragm 11 or the insulating layer 14. These vestigial spaces may also contain the medium enclosed in the hollow space 15. The size of the vestigial hollow space 15 in the activated state (FIG. 2) is, however, insignificantly small in comparison with the size of the hollow space 15 in the state of rest of the diaphragm 11.

FIG. 3 shows a further embodiment of an actuating device, in which parts that correspond to those of FIGS. 1 and 2 are given the same reference numbers. As an addition to the embodiment according to FIGS. 1 and 2, a pressure space 18 is provided, which is connected to the hollow space 15 by way of a duct 19.

The hollow space 15, the duct 19 and the pressure space 18 are filled with a compressible fluid, for example a gas, in particular air. When the diaphragm 11 is now moved from the illustrated inoperative position into the activated position, in which the hollow space 15 has almost completely disappeared, the air is displaced from the hollow space 15 by way of the duct 19 into the pressure space 18. It is thus under a higher pressure. When the electrical voltage at the electrode terminals 16, 17 is turned off, and the holding force effected by the electrostatic field slackens, the gas pressure in the pressure space 18 serves to restore the diaphragm 11 to its inoperative position again.

FIG. 4 shows a further embodiment of an actuating device with two diaphragms, in which parts that correspond to those of FIGS. 1 to 3 have been given the same reference numbers.

Next to the first diaphragm 11 there is provided a second diaphragm 21, which can be of one-piece construction with the first diaphragm 11. The diaphragms 11, 21 are connected to the carrier 13 by way of an insulating member 22, so that together with the carrier 13 they form two separate hollow spaces 15, 18. Both hollow spaces are connected to one another by means of a duct 19, however. Each hollow space 15, 18 has a respective electrically conductive surface layer 14, 23 arranged in it. The surface layer 23 in the hollow space 18 has an electrode terminal 20. The two surface layers 14, 23 are isolated from one another electrically by way of the insulating member 22. The two diaphragms 11, 21 can therefore also be separately activated. The electrode terminal 17 is the same for both diaphragms 11, 21, but the diaphragm 11 is activated when the electrode terminal 16 has a voltage applied to it with respect to the electrode terminal 17. The diaphragm 21, in the other hand, is activated when the electrode terminal 20 is used.

When the diaphragm 11 moves into the activated state, that is, causes the hollow space 15 to disappear, the fluid located therein escapes through the duct 19 into the hollow space 18 of the other diaphragm 21, which here functions as a pressure space for the first diaphragm 11. Conversely, the hollow space 15 of the first diaphragm 11 acts as a pressure space for the second diaphragm 21 when this is moved from the illustrated state of rest into the active position. If the fluid in the two hollow spaces 15, 18 and in the duct 19 is a non-compressible fluid, for an example a liquid, the two diaphragms 11, 21 can only be operated alternately, that is to say, when one diaphragm is in the state of rest, the other diaphragm is in the activated position. If the gas is compressible, both diaphragms 11, 21 can be in the state of rest. It is preferred, however, for the pressure of the fluid in the hollow spaces 15, 18 and in the duct 19 and for the rigidity or the resilience of the diaphragms to be defined in relation to one another so that, with the field turned off, one diaphragm moves into the state of rest when the other diaphragm moves into the activated state.

In the embodiment illustrated in FIG. 4, only two diaphragms 11, 21 are provided. Instead, however, there can be several diaphragms. The pressure can then be adjusted so that only one diaphragm or a predetermined number of diaphragms can be in the activated state.

Figure 5:
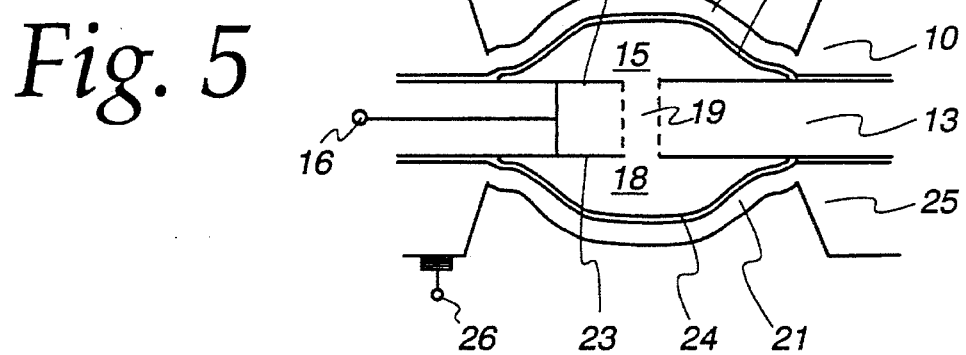
FIG. 5 shows a further actuating device with two diaphragms.

In addition to the possibility illustrated in FIG. 4, that the several diaphragms are located on one side of the carrier 13, in FIG. 5 a further embodiment is illustrated in which two diaphragms are arranged on opposite sides of the carrier 13. Parts which correspond to those of FIGS. 1 to 4 have been given the same reference numbers. Unlike FIG. 4, where the substrate 10 is arranged only on one side of the carrier 13, in addition to the substrate 10 on one side of the carrier 13, provision is made for a further substrate 25 to be arranged on the opposite side of the carrier in the embodiment illustrated. The second diaphragm 21 is etched from this substrate 25. Between the substrate 25 and the carrier 13 there is an insulating layer 24. As before, the diaphragm 11 encloses a hollow space 15 with the carrier 13. The diaphragm 21 encloses the hollow space 18 with the carrier 13. Both hollow spaces are connected by the duct 19, which in this case can be of relatively wide construction. The surface layers 14, 23 can be jointly connected to the electrode terminal 16. The control of the individual diaphragms is then effected by way of the electrode terminal 17 or by way of an electrode terminal 26, the electrode terminal 26 being responsible for activating the diaphragm 21. Both diaphragms 11, 21 can be operated in an alternating mode, just as in FIG. 4. When one diaphragm 11, 21 is moved into the activated state, the pressure in the hollow space 18, 15 of the other diaphragm 21, 11 increases.

Figure 6:
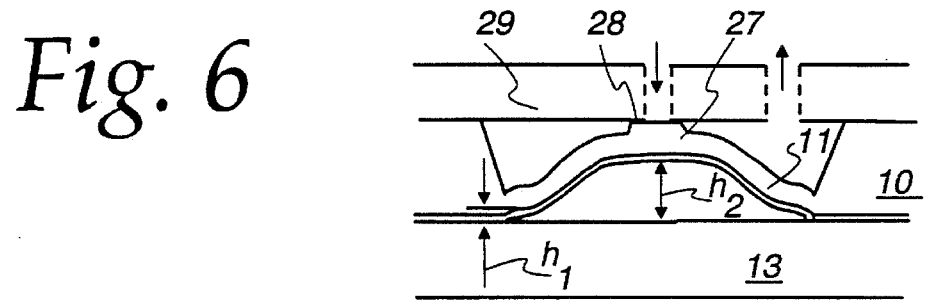
FIG. 6 shows a microvalve as a 2-way valve.

An actuating device of the kind illustrated can be used in many areas of application. For example, as it moves, the diaphragm can operate a switch. FIG. 6 shows another example of application, in which the actuating device is used in a 2-way valve. On its side remote from the carrier 13, the diaphragm 11 here carries a closure member 27 which co-operates with a valve seat 28 in a housing 29. The housing can be located on the side of the substrate 10 remote from the carrier 13. The valve is closed in the state of rest illustrated in FIG. 6, that is, the closure member 27 lies on the valve seat 28. When the diaphragm is activated, the closure member 27 is retracted by a distance that corresponds to the difference between the spacing h2 and the spacing h1. It is clear that here the closure member 27 is removed relatively far from the valve seat 28 so that the valve presents no appreciable flow resistance.

Figure 7:
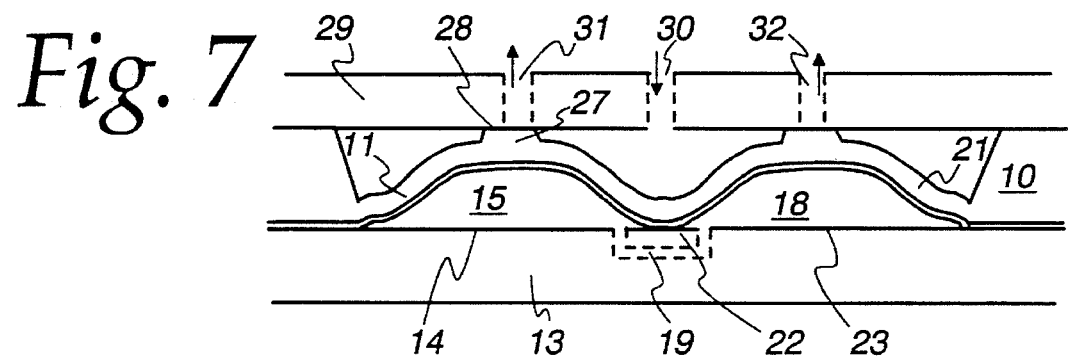
FIG. 7 shows a microvalve as a 3-way valve.

FIG. 7 shows a 3-way valve in which an actuating device according to FIG. 4 is used. Elements which correspond to those of FIGS. 1 to 6 have been given the same reference numbers. Using the valve illustrated, a inlet 30 can either be connected with an outlet 31 or with another outlet 32. For that purpose the two diaphragms 11, 21 are operated alternately. When both diaphragms 11, 21 are in the inoperative state, the valve is completely closed.

FIG. 8 shows a rocker-action actuating device which differs from the actuating device according to FIG. 1 in that the centre of the diaphragm 11 is not caused to engage the carrier 13 but is left substantially unchanged in its height. The surface layer is here divided into two regions 14' and 14" separated electrically from one another, each of which is connected to its own respective electrode terminal 16, 20. A lever 33 is arranged on the side of the diaphragm 11 remote from the carrier 13. The remaining parts correspond to those of the preceding Figures. The electrode terminals 16 and 20 are able to have voltage applied to them independently of one another.

Figure 8A:
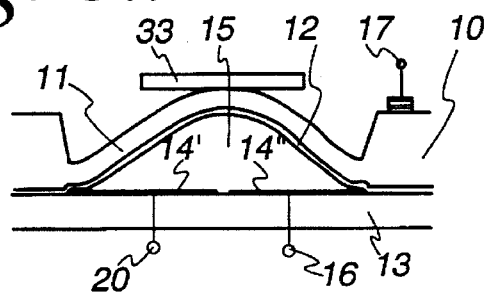
FIGS. 8a–8c shows a rocker-action actuating device.
Figure 8B:
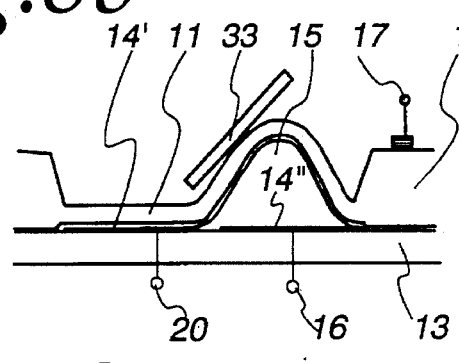
Figure 8C:
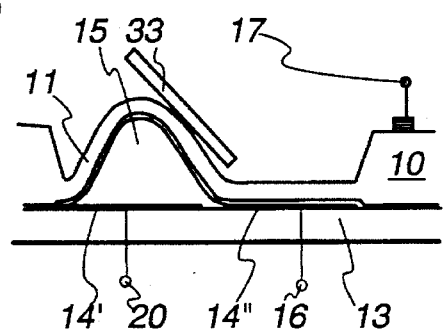

FIG. 8a shows the actuating device in its non-activated state. The diaphragm 11 arches outwards under the pressure in the hollow space 15. The hollow space 15 is in this case preferably filled with a non-compressible fluid. In FIG. 8b, the left-hand electrode terminal 20 has voltage applied to it. The left side of the diaphragm 11 is drawn downwards against the carrier 13. The middle or the centre of the diaphragm 11 is thereby tilted, so that the right-hand part of the lever 33 is moved upwards. Because the hollow space 15 is filled with the non-compressible fluid, the diaphragm 11 is unable to lie completely flat against the carrier 13. The volume of the hollow space 15 remains substantially constant, so that the tilting movement of the middle of the diaphragm is further reinforced. FIG. 8c shows the opposite case, in which the electrode terminal 16 has voltage applied to it. The right-hand side of the diaphragm 11 is caused to lie flat against the carrier 13. The centre of the diaphragm 11 now tilts in the other direction, so that the left-hand end of the lever 33 is moved upwards.

The tilting movement is reinforced by the lever 33. Mechanical positioning devices, for example, can be operated in this manner. On the other hand, the lever 33 can also be provided with a reflective surface, so that a light source can be deliberately changed by the tilting movement.

Figure 9:
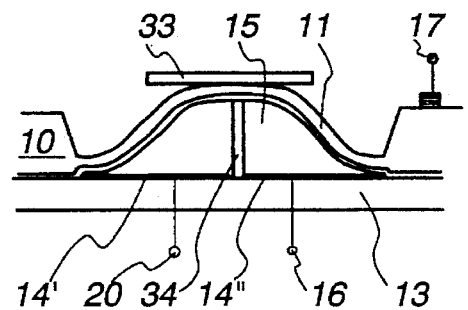
FIG. 9 shows a further embodiment of a rocker-action actuating device.

FIG. 9 shows another embodiment, in which a support 34 is provided for restoration of the diaphragm. The actuation of the diaphragm is effected in the same manner as in FIG. 8, that is, either the electrode terminal 16 or the electrode terminal 20 is supplied with voltage. The displacement and the tilting movement of the centre of the diaphragm 11 is less in the embodiment illustrated in FIG. 9 than in that illustrated in FIG. 8. The mode of operation is otherwise the same. At any rate, the hollow space 15 does not have to be filled with a non-compressible fluid in the embodiment illustrated in FIG. 9. It can also be filled with a compressible fluid. The speed of actuation can be substantially increased by this measure. Furthermore, manufacture of such an actuating device is simpler.

Figure 10:
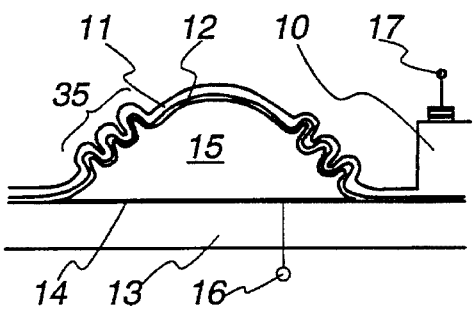
FIG. 10 shows an actuating device with a corrugated diaphragm.

FIG. 10 shows a further embodiment of an actuating device in which corrugated regions 35 are provided in the diaphragm 11. In these regions the diaphragm 11 is able to expand more than in its other regions. This has the advantage that the middle of the diaphragm 11 in the state of rest can be further removed from the carrier 13 under the influence of the pressure in the hollow space 15. The corrugated regions can be in the form, for example, of concentric rings. In that case, the diaphragm appears-undulating in cross-section, as illustrated in FIG. 10. The corrugated regions may also, however, by spiral in form. The movement of the diaphragm 11 towards the carrier 13 then follows the spiral in the corrugated region. The fluid can be squeezed out through the spiral path that is formed.

The form of the diaphragm 11 and of the carrier 13 of the actuating device can be extremely varied. The important factor is that in the movement of the diaphragm towards the carrier, large parts of the diaphragm are able to position themselves gradually flat against the carrier. The movement of the diaphragm is effected from the regions closer to the carrier to the regions further away from the carrier. For the restoring force, diaphragm and carrier must in the majority of cases be separated by a displaceable, or at least compressible, fluid.

Figure 11:
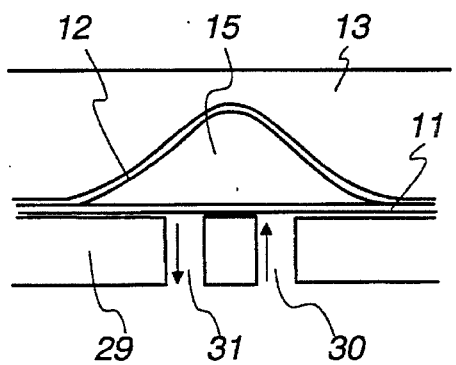
FIG. 11 shows a valve with a hollow space in the carrier.

Such conditions are also fulfilled when, as in FIG. 11, the diaphragm 11 is flat and the carrier 13 has a concave curvature. In this case, as in other cases too, the insulating layer 12 can be secured not to the diaphragm 11, but to the carrier 13. For reasons of clarity, the surface layer 14 has been omitted in FIG. 11. In such an embodiment, a pressure in the hollow space 15 as a prerequisite for restoring the diaphragm 11 to the state of rest is not necessary to the extent that it is in other embodiments. In an extreme case it can even be omitted. The restoring force is applied by the resilience of the diaphragm 11. FIG. 11 shows the actuating device in a 2-way valve. Here, the diaphragm 11 lies flat on the housing 29 in the state of rest and blocks both the inlet 30 and the outlet 31.

Figure 12:
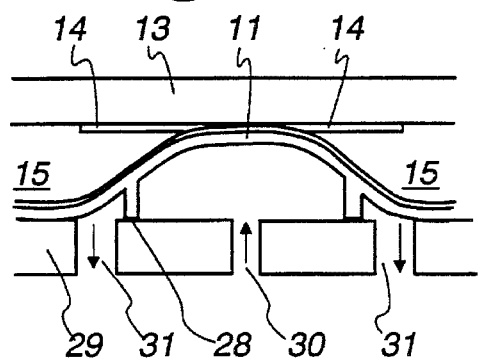
FIG. 12 shows a valve with its first region in the middle of the diaphragm.

As is apparent from FIG. 12, the first region need not necessarily be arranged at the outer edge of the diaphragm. It may also be arranged in the middle of the diaphragm 11. In this embodiment, when the surface layer 14 has voltage applied to it, the diaphragm will approach the carrier 13 and lie flat against it from the inside outwards. In FIG. 12, this actuating device is used in conjunction with a 2-way valve, where the valve seat 28 has been displaced further towards the outside than is the case, for example in the embodiment according to FIG. 6. By this means, the valve seat is enlarged. When both the middle of the diaphragm and the edge regions (not illustrated) of the diaphragm are joined to the carrier 13, it is possible for the diaphragm 13 to assume a desired state of rest even when there are no restoring forces available in the hollow space 15. If corrugated regions are provided along the periphery of the diaphragm 11, the diaphragm becomes more flexible in this region and a vertical displacement of the valve seat 28 becomes possible.

The operating characteristics of the actuating device can be controlled by means of the filling of the hollow space 15. If the electrical conductivity of this filling is kept low, the electrical losses are contained within limits. Moreover, contamination with particles, that is, with solid particles, is kept to the absolute minimum. This ensures that the actuating device is able to operate mechanically as desired in a troublefree fashion.

We claim:

1. A miniature actuating device having a carrier, a diaphragm, a hollow space formed between the carrier and the diaphragm and an insulating layer arranged between them, and having two electrode terminals for producing an electrostatic field between the diaphragm and the carrier for an activated state of the diaphragm, said hollow space being bounded by two surfaces which in a contact region, in which the surfaces touch each other, are parallel to one another, and at least in an application region adjoining the contact region, in which the two surfaces can be brought to bear on one another, are buckle-free.

2. An actuating device according to claim 1, in which the insulating layer extends over the entire diaphragm.

3. An actuating device according to claim 1, in which the hollow space is filled with a fluid having a predetermined dielectric constant, predetermined low conductivity and low contamination with particles of solid material.

4. An actuating device according to claim 1 in which, in the state of rest, a first region is provided in which the diaphragm has a spacing from the carrier, the spacing corresponding to the thickness of the insulating layer, and a second region is provided in which the diaphragm has larger spacings from the carrier, wherein in the activated state the size of the spacings in the second region decreases to the size of the spacing in the first region.

5. An actuating device according to claim 4, in which the first region completely encompasses an edge of the diaphragm.

6. An actuating device according to claim 4, in which the first region is arranged in the middle of the diaphragm.

7. An actuating device according to claim 4, in which the largest spacing in the second region is a multiple of the spacing in the first region.

8. An actuating device according to claim 1, in which the carrier has an electrically conductive surface layer which is arranged in the hollow space.

9. An actuating device according to claim 1, in which the surface of the carrier in the hollow space is substantially flat.

10. An actuating device according to claim 1, in which the diaphragm is flat in the state of rest and the carrier has a concave curvature.

11. An actuating device according to claim 1, in which the hollow space is connected to a pressure-storage space.

12. An actuating device according to claim 11, in which the pressure-storage space has a constant volume and the hollow space and pressure-storage space are filled with a fluid, the fluid being compressible.

13. An actuating device according to claim 12, in which at least one further diaphragm is provided, the hollow space of which forms the pressure space for the first diaphragm.

14. An actuating device according to claim 13, in which the pressure of the fluid and the rigidity of the diaphragm are defined in relation to one another so that, with the field turned off, one diaphragm moves into the state of rest when another diaphragm moves into the activated state.

15. An actuating device according to claim 13, in which the diaphragms are arranged next to one another.

16. An actuating device according to claim 13, in which the diaphragms are arranged on the same side of the carrier.

17. An actuating device according to claim 13, in which the diaphragms are arranged on opposite sides of the carrier.

18. An actuating device according to claim 8, in which the surface layer is subdivided into at least two regions separated electrically by an insulating region, the regions being arranged to be separately supplied with voltage.

19. An actuating device according to claim 18, in which a support for the diaphragm is arranged between the two regions.

20. An actuating device according to claim 18, in which the diaphragm has a rigid lever in the area of the insulating region on its side remote from the carrier.

21. An actuating device according to claim 1, in which the diaphragm has corrugated regions.

22. An actuating device according to claim 21, in which the corrugated regions are in the form of concentric rings.

23. An actuating device according to claim 21, in which the corrugated regions are arranged in a spiral form.

24. A microvalve with a miniature actuating device according to claim 1, in which a closure member is arranged on the side of the diaphragm remote from the carrier.

* * * * *